(12) United States Patent
Fujino et al.

(10) Patent No.: US 6,426,388 B1
(45) Date of Patent: Jul. 30, 2002

(54) MODIFIED POLYOLEFIN COMPOSITION AND USES THEREOF

(75) Inventors: Kenichi Fujino; Terumasa Fujitaka; Kazuhiro Usui; Kouji Masumoto; Hidetoshi Yoshioka, all of Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/709,329

(22) Filed: Nov. 13, 2000

(30) Foreign Application Priority Data

Nov. 18, 1999 (JP) ............................. 11-328555

(51) Int. Cl.$^7$ .................. C08F 255/00; C08F 255/04; C08F 255/10
(52) U.S. Cl. .................. 525/285; 525/322; 525/324
(58) Field of Search .................. 525/285, 324, 525/322

(56) References Cited

U.S. PATENT DOCUMENTS

| | | |
|---|---|---|
| 3,708,555 A | 1/1973 | Gaylord |
| 4,753,997 A | 6/1988 | Shyu et al. |
| 4,857,254 A | 8/1989 | Wong |
| 4,908,411 A | 3/1990 | Kinoshita et al. |
| 4,917,734 A | 4/1990 | Demay et al. |
| 4,929,682 A | 5/1990 | Banzi et al. |
| 5,021,510 A | 6/1991 | Vroomans |
| 5,037,891 A | 8/1991 | Takao et al. |
| 5,180,788 A | 1/1993 | Vroomans |
| 6,319,976 B1 * | 11/2001 | DeNicola, Jr. |

FOREIGN PATENT DOCUMENTS

| | | |
|---|---|---|
| JP | 1-221475 | 9/1989 |
| JP | 3-227341 | 10/1991 |
| JP | 6-122738 | 5/1994 |
| JP | 8-003415 | 1/1996 |
| JP | 8-048873 | 2/1996 |
| JP | 8-208907 | 8/1996 |
| JP | 9-040724 | 2/1997 |
| JP | 10-036456 | 2/1998 |
| JP | 10-306269 | 11/1998 |
| JP | 4-046946 | 2/1999 |
| WO | 94/15981 | 7/1994 |

* cited by examiner

Primary Examiner—Jeffrey Mullis
(74) Attorney, Agent, or Firm—Oblon, Spivak, McClelland, Maier & Neustadt, P.C.

(57) ABSTRACT

Disclosed is a novel chlorine-free modified polyolefin composition with excellent adherence to polyolefin substrates, with excellent solventresistance, oil resistance and weather resistance, with no tack, and also with excellentcohesion, obtainable by using 0.5 to 15% (by weight) of maleic anhydride and 0.1 to 7.5% (by weight) of styrenic monomer to polypropylene, eyhylene-propylene copolymer or ethylene-propylene-buten copolymer, and by graft polymerizing so as the weight ratio of maleic anhydride to styrenic monomer to become not less than 2 to not more than 5.

18 Claims, No Drawings

MODIFIED POLYOLEFIN COMPOSITION AND USES THEREOF

BACKGROUND OF THE INVENTION

The present invention relates to a novel chlorine-free modified polyolefin composition with excellent adherence to nonpolar sheets, films and moldings of polypropylene, polyethylene, ethylene-propylene copolymer, ethylene-propylene-diene copolymer, ethylene-vinyl acetate copolymer, etc., with excellent solvent resistance, oil resistance and weather resistance, with no tack, and also with excellent cohesion.

Because of low price, and many excellent properties such as moldability, chemical resistance, water resistance and electrical characteristics, polyolefins such as polypropylene and polyethylene are used widely in recent years as sheets, films, moldings, etc. Different from polar substrates such as polyurethane resin, polyamide resin, acrylic resin and polyester resin, however, polyolefin substrates are nonpolar and crystalline, leading to drawbacks of difficult paintability and adhesion.

So far, modified polyolefins obtainable by modifying polyolefins with unsaturated carboxylic acid and/or acid anhydride, and further acid-modified chlorinated polyolefins obtainable by chlorinating them have been used as paint additives, primers and adhesives, because of excellent adherence to said nonpolar substrates.

However, conventional acid-modified polyolefins represented by maleic anhydride-modified polyolefins have drawbacks of poorer adherence to non-polar substrates, more liability to cause cohesive failure, stronger tackiness, etc. compared with chlorination type modified polyolefins. Moreover, even chlorinated polyolefins with excellent adherence also have drawbacks of poor weather resistance etc. and, in addition, from recent upsurge of environmental problems, their uses have also become to be restricted. Based on such background, the development of novel chlorine-free resin with adherence to nonpolar substrates equal to or more than that of chlorinated polyolefin, and also with excellent physical properties such as tackiness and cohesion has been expected.

As one of the reasons why maleic anhydride-modified polyolefin is in short of physical properties, low activity of maleic anhydride on radical polymerization can be mentioned. In order to use maleic anhydride-modified polyolefin for the uses of adhesives, primers, paint additives, etc. for nonpolar substrates, at which the invention aims, it is required to graft a considerable quantity of maleic anhydrides onto polyolefin. However, because of low grafting rate by usual modification method, necessary physical properties cannot be obtained. If employing severe conditions in attempt to raise the grafting rate, then remarkable decrease in molecular weight results, leading to decreased physical properties. In the uses of compatibilizers, moldings, adhesives, etc., such techniques for obtaining modified polyolefin with high molecular weight and high grafting rate that use of maleic anhydride and styrenic monomer in combination are known, and, for example, U.S. Pat. No. 3,708,555, Japanese Unexamined Patent Publication Nos. Hei 1-221475, Hei 8-3415, 48873, 208907, Hei 10-36456, 306269, etc. are exemplified, including the literatures described in G. Moad: Prog. Polym. Sci., 24, 81 (1999). With these techniques, styrenic monomer equal to or more quantity than maleic anhydride is used. Moreover, in U.S. Pat. No. 5,021,510, Japanese Unexamined Patent Publication Nos. Hei 3-227341, Hei 4-46946, Hei 6-122738, Hei 9-40724, etc., the ratio of maleic anhydride to styrenic monomer is not particularly described, or the techniques cover very broad range.

However, in the uses, at which the invention aims, these conventional techniques could not be utilized from the facts that the solvent resistance, oil resistance and weather resistance decreased remarkably because of a large quantity of styrenic components contained. Moreover, in the case of low content of propylene in raw material polyolefin or in the case of high content of styrenic component in modified polyolefin, the adherence to nonpolar substrates decreased, which made it impossible similarly to utilize for those uses.

The purpose of the invention lies in providing a novel chlorine-free modified polyolefin with excellent adherence to polyolefinic resin moldings, with excellent solvent resistance, oil resistance and weather resistance, with no tack, and also with excellent cohesion.

As a result of diligent investigations for solving this subject, the inventors have found that, by using particular polyolefin for raw material and further using particular quantities of maleic anhydride and styrenic monomer for graft polymerization, thus by controlling the structure and molecular weight of modified product, the adherence to nonpolar substrates, solvent resistance, oil resistance, weather resistance, elimination of tack and enhancement of cohesion, etc. can be achieved at the same time, leading to the invention based on this knowledge.

SUMMARY OF THE INVENTION

As described, according to the invention, following (1) through (9) are provided.

(1) A modified polyolefin composition having the weight average molecular weight of not less than 30,000 to not more than 150,000, obtainable by graft polymerizing 0.5 to 15.0% (by weight) of (B) maleic anhydride and 0.1 to 7.5% (by weight) of (C) styrenic monomer to (A) polypropylene, ethylene-propylene copolymer or ethylene-propylene-butene copolymer, so as the grafting weight ratio (B/C) of (B) to (C) to become not less than 2 to not more than 5.

(2) The modified polyolefin composition described in (1), wherein the composition ratio of propylene in (A) polypropylene, ethylenepropylene copolymer or ethylene-propylene-butenecopolymer described is not less than 50%.

(3) A modified polyolefin composition obtainable by graft polymerizing (B) maleic anhydride and (C) styrenic monomer onto polyolefin, characterized by said polyolefin being (A) polypropylene, ethylene-propylene copolymer or ethylene-propylene-butene copolymer, the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

(4) The modified polyolefin composition described in (3), wherein the composition ratio of propylene (by weight) in (A) polypropylene, ethylene-propylene copolymer or ethylene-propylene-butene copolymer is not less than 50%.

(5) The modified polyolefin composition described in (3) or (4), wherein it is a chlorine-free modified polyolefin composition.

(6) An adhesive using the modified polyolefin composition of (1) through (5).

(7) A primer using the modified polyolefin composition of (1) through (5).

(8) A paint binder using the modified polyolefin composition of (1) through (5).

(9) An ink binder using the modified polyolefin composition of (1) through (5).

DETAILED DESCRIPTION OF THE INVENTION

The nonpolar substrates referred to so in the invention point to nonpolar sheets, films or moldings of polypropylene, polyethylene, ethylene-propylene copolymer, ethylene-propylene-diene copolymer, ethylene-vinyl acetate copolymer, etc. Also, they include surface-treated ones of these substrates with plasma, corona or the like.

The polyolefins that become the raw material of modified polyolefin to be used in the invention are polypropylene, ethylene-propylene copolymer and ethylene-propylene-butene copolymer.

The composition ratio of propylene in the polyolefins that become the raw material of modified polyolefin is preferable to be not less than 50%, more preferably not less than 60% to not more than 98%. If under 50%, then the adherence to propylene and polyolefin substrates is poor.

The usable molecular weight of polyolefin can be selected freely so as the weight average molecular weight of modified polyolefin to become 30,000 to 150,000, but, even a polyolefin with weight average molecular weight of over 150,000 becomes usable by the publicly known methods for adjusting the molecular weight to a suitable range by degrading in the presence of heat or radical, and others.

As the styrenic monomer to be used in the invention, styrene is used most preferably, but unsaturated aromatic monomers such as o-,p-, α-methylstyrene and divinylbenzene can also be used.

In the invention, it is required to graft maleic anhyride and styrenic monomer in amounts of 0.5 to 15.0% and 0.1 to 7.5%, respectively, to the weight of raw material polyolefin. In addition, it is required to control the ratio of grafting weight of maleic anhyride to grafting weight of styrenic monomer so as to become not less than 2 to not more than 5. If the grafting weight of maleic anhyride is under 0.5%, then the solubility into solvent and the compatibility with other resins are poor, and, if over 15.0%, then a large quantity of maleic anhyrides are used, resulting in the generation of much residual monomer, which is unpreferable. If the grafting weight of styrenic monomer is under 0.1%, then effect of suppressing the drop of molecular weight and effect of increasing the grafting rate of maleic anhyride cannot be obtained, thus generating much residual maleic anhyride monomer. If over 7.5%, then the solvent resistance, oil resistance and weather resistance decrease remarkably or the adherence decreases, which is unpreferable. Similarly, with regard to the ratio of grafting weight of maleic anhyride to grafting weight of styrenic monomer, too, if it is over 5, then effect of suppressing the drop of molecular weight and effect of increasing the grafting rate of maleic anhyride cannot be obtained, thus generating much residual maleic anhyride monomer, and, if under 2, then the solvent resistance, oil resistance and weather resistance decrease remarkably or the adherence decreases, which is unpreferable.

In the invention, the grafting reaction can be performed irrespective of the presence of radical initiator, but it is more preferable to use the initiator, and use of organic peroxides, for example, benzoyl peroxide, dicumyl peroxide, lauroyl peroxide, di-t-butyl peroxide, cumene hydroperoxide, etc. is preferable. The type and the use level of radical initiator can be selected appropriately depending on the reaction conditions, but it is desirable to use around 0.1 to 5 wt. %. If under this level, then the grafting reaction rate decreases, and, even if over that, the drop of grafting reaction rate and the side reactions like internal crosslinking and decreasing of molecular weight can result.

The grafting reaction of maleic anhyride and styrenic monomer onto polyolefin raw material is possible to perform by publicly known methods, for example, the solution method wherein raw material polyolefin is dissolved into solvent such as toluene, to which radical initiator, maleic anhyride and styrenic monomer are added, and the melt method wherein, employing Banbury mixer, kneader, extruder, etc., radical initiator, maleic anhyride and styrenic monomer are added to molten raw material polyolefin, and the like are mentioned. The order, method, etc. of adding maleic anhyride, styrenic monomer and radical initiator can be selected appropriately. Moreover, it is also possible to remove residual monomers by providing a pressure-reducing process at the time of completion of reaction.

The weight average molecular weight of modified polyolefin obtained is 30,000 to 150,000, preferably 30,000 to 120,000. If under 30,000, then the adherence to nonpolar substrates and the cohesion are poor, and, if over 150,000, the workability and the solubility into solvent decrease due to the increase of viscosity.

The weight average molecular weight of modified polyolefin can be determined by means of GPC (gel permeation chromatography) etc. Moreover, the grafting rate of maleic anhyride and styrenic monomer can be measured by extracting them using MEK, acetone, MEK-methanol mixed solvent, or the like, and then by using titration, FT-IR, NMR, etc.

The inventive modified polyolefin can be used as an adhesive, primer, paint binder resin and ink binder resin for nonpolar substrates. It can be used in the forms adapted to uses such as solution, powder and sheet. Moreover, if needed, additives, for example, antioxidant, light stabilizer, ultraviolet absorber, pigment, dye, inorganic filler, etc. may also be formulated for use. Moreover, based on the fact that the inventive modified polyolefin is excellent also in the compatibility with other resins, other resins such as urethane resin, epoxy resin, acrylic resin, phenol resin, alkyd resin, silicone resin and nitrocellulose may be blended additionally when using as a binder for paint or ink, if further needed.

In following, the invention will be illustrated in more detail based on examples, but the invention is not confined thereto.

EXAMPLE

Example-1

After 35 g of ethylene-propylene-butene copolymer (propylene content 65%, weight average molecular weight ca. 90,000) were placed in a Labo Plastomill (from Toyo Seiki) and molten at 170° C., 2.1 g of maleic anhydride, 1.1 g of styrene and 0.7 g of Perbutyl D (from Nippon Oil and Fats) were added, which was kneaded for 10 minutes. The reaction product was taken out and cooled to room temperature to obtain a modified polyolefin having the weight average molecular weight of 75,000, grafting rate of maleic anhydride of 5.4% and grafting rate of styrene of 2.3%.

Example-2

After 1 kg of propylene-ethylene copolymer (propylene content 95%, weight average molecular weight ca. 300,000), 40 g of maleic anhydride, 10 g of styrene and 10 g of Perhexa 25B (from Nippon Oil and Fats) were mixed homogeneously in a mixer, the mixture was placed in a same-directional twin screw extruder (15 mm$\phi$, L/D=60) at a velocity of 500 g/hr under stream of nitrogen, using feeder. The temperature of the second through fifth barrels were set at 170° C., the pressure reduction treatment was performed at the sixth and seventh barrels, and the reaction was conducted at a number of revolutions of 300 rpm. The reaction product was cooled to room temperature to obtain a modified polyolefin having weight average molecular weight of 90,000, grafting rate of maleic anhydride of 3.5% and grafting rate of styrene of 0.8%.

Example-3

After 15 kg of isotactic polypropylene subjected to oxygen degradation treatment (weight average molecular weight 130,000) and 85 kg of toluene were placed in a 200L reaction vessel and molten at a refluxing temperature, the temperature was adjusted to 85° C. After replaced with nitrogen, 1.2 kg of maleic anhydride and 0.4 kg of p-methylstyrene were added, which was stirred homogeneously. Thereafter, 0.5 kg of benzoyl peroxide (60% xylene solution) were added gradually over 1 hour, and the reaction was continued further for 30 minutes. The reaction product was cooled to room temperature and purified in methanol to obtain a modified polyolefin having weight average molecular weight of 55,000, grafting rate of maleic anhydride of 6.5% and grafting rate of p-methylstyrene of 1.8%.

Comparative Example-1

In the procedure of Example-1, the reaction was conducted without using styrene to obtain a modified polyolefin with weight average molecular weight of 50,000 and grafting rate of maleic anhydride of 2.3%.

Comparative Example-2

In the procedure of Example-2, the reaction was conducted making the use level of styrene 42 g to obtain a modified polyolefin with weight average molecular weight of 120,000, grafting rate of maleic anhydride of 3.8% and grafting rate of styrene of 3.7%. Of the modified polyolefins obtained in Example 1 through 3 and Comparative examples 1 and 2 aforementioned, 10 wt. % toluene solutions were prepared, respectively, and following tests were performed. The results are shown in Table 1.

Transparency Test of Solution

Said toluene solution was allowed to stand statically for 24 hours at 20° C. to visually evaluate the transparency of solution.

Adherence Test

Said toluene solution was spray coated onto an ultrahigh rigidity polypropylene plate so as the dried film thickness to become 10 to 15 $\mu$m, which was dried for 30 minutes at 80° C. After allowed the specimen to stand statically for 3 days at room temperature, slits reaching the base were engraved on the surface of coated film with cutter to make 100 crosscuts at intervals of 1 mm. Cellophane adhesive tape was adhered closely thereon and peeled off in the direction of 180° five times to count the number of remaining crosscuts.

Heat Seal Strength Test

Said toluene solution was coated onto a polypropylene film after corona surface treatment (surface tension 38 dyne/cm) using #20 Meier bar, which was dried for 15 hours at room temperature. The specimen was folded so that the film surfaces were superposed and heat sealed under the conditions of 1.5 kg/cm$^2$, 90° C. and 10 seconds using No.276 Heat Seal Tester (from Yasuda Seiki Seisakusho). Each specimen was cut so as the width to become 1 cm and peeled off under the conditions of 5 kg in weight and 100 mm/min using Tensilon to measure the peeling strength. Test was made thrice to obtain the average value thereof as a result.

Tackiness Test

Said toluene solution was coated onto a polypropylene film after corona surface treatment (surface tension 38 dyne/cm) using #20 Meier bar, which was dried for 15 hours at room temperature. The specimen was folded so that the film surfaces were superposed and, after pressed down lightly with fingers, it was peeled off. The liability of peeling was observed to obtain an index of tackiness.

TABLE 1

Test results

| Sample | Transparency | Adherence test | Heat seal strength | Tackiness |
|---|---|---|---|---|
| Example-1 | Good | 100/100 | 410 g/cm | None |
| -2 | Good | 100/100 | 450 g/cm | None |
| -3 | Good | 100/100 | 370 g/cm | None |
| Comparative Example-1 | Turbid | 100/100 | 200 g/cm | Strong |
| -2 | Good | 55/100 | 250 g/cm | None |

Paint Test

Of the modified polyolefins obtained in Examples 1 through 3 and Comparative Examples 1 and 2, 30 wt. % toluene solutions were prepared, respectively, and paints of following formulations were prepared making them as binder resins.

| | |
|---|---|
| Binder resin (30% toluene solution) | :100 pts. by weight |
| Alkyd resin (Phthalkyd V904, from Hitachi Chemical) | :10 pts. by weight |
| Titanium dioxide | :4.5 pts. by weight |
| Carbon black | :0.5 pts. by weight |
| Rouge | :2 pts. by weight |
| Talc | :15 pts. by weight |
| Silica delustering agent | :3 pts. by weight |

After kneading for about 1 hour in a sand mill, said composition was diluted with toluene so as the viscosity to become 12 to 13 sec/20° C. through Ford cup #4 for adjustment. Each paint was spray coated onto an ultrahigh rigidity polypropylene plate so as the dried film thickness to become 30 to 35 $\mu$m, which was dried for 30 minutes at room temperature and then baked for 30 minutes at 80° C. After allowed the specimen to stand statically for 48 hours at room temperature, following tests were performed. The results are shown in Table 2.

Adherence Test

The crosscut test similar to above was performed.

Accelerated Weathering Test

The specimen was treated for 500 hours in a QUV Accelerated Weathering Tester to measure the yellowing ($\Delta$YI).

Gasoline Resistance Test

A scratch (X mark) reaching the base was engraved on the surface of each painted film with cutter knife and soaked into gasoline to visually observe the state of painted film.

Oil Resistance Test

Several drops of mineral oil were dropped onto the surface of each painted film and allowed to stand statically for 2 hours to observe the change of painted film.

TABLE 2

| Sample | Test results | | |
|---|---|---|---|
| | Adherence test | Accelerated weathering test | Gasoline Resistance test |
| Example-1 | 100/100 | 2.2 | After 2 hr soaking, no abnormality |
| -2 | 100/100 | 2.4 | After 2 hr soaking, no abnormality |
| -3 | 100/100 | 3.1 | After 2 hr soaking, no abnormality |
| Comparative Example-1 | 100/100 | 1.8 | After 2 hr soaking, no abnormality |
| -2 | 100/100 | 25.3 | After 20 min soaking, film peeling |

Primer Test

Of the modified polyolefins obtained in Examples 1 through 3 and Comparative Examples 1 and 2, 10 wt. % toluene solutions were prepared, respectively, and spray-coated onto an ultrahigh rigidity polypropylene plate so as the dried film thickness to become 10 to 15 μm, which was dried for 30 minutes at 80° C. Next, two-component urethane-based upper white paint was spray coated, so as the dried film thickness to become 45 to 50 μm. After allowed to stand statically for 15 minutes at room temperature, this was baked for 30 minutes at 90° C. The specimen was allowed to stand statically for 3 days at room temperature and then tests similar to said paint test were performed. The results are shown in Table 3.

TABLE 3

| Sample | Test Results | | |
|---|---|---|---|
| | Adherence test | Oil resistance Test | Gasoline resistance test |
| Example-1 | 100/100 | No abnormality | After 2 hr soaking, no abnormality |
| -2 | 100/100 | No abnormality | After 2 hr soaking, no abnormality |
| -3 | 100/100 | No abnormality | After 2 hr soaking, no abnormality |
| Comparative Example-1 | 100/100 | No abnormality | After 2 hr soaking, no abnormality |
| -2 | 30/100 | Film swelling | After 40 min soaking, film peeling |

Ink Test

Of the modified polyolefins obtained in Examples 1 through 3 and Comparative examples 1 and 2, 30 wt. % toluene/ethyl acetate (80/20, weight ratio) solutions were prepared, respectively, and inks of following formulations were prepared making them as binder resins.

| | |
|---|---|
| Binder resin (30% solution) | :100 pts. by weight |
| Urethane resin for ink | :50 pts. by weight |
| Titanium dioxide | :180 pts. by weight |
| Ethyl acetate | :100 pts. by weight |
| Isopropyl alcohol | :50 pts. by weight |

Said composition was milled in a paint shaker to prepare white printing ink. The printing ink obtained was coated onto an oriented polypropylene film (OPP) with #12 Meier bar. Cellophane tape was stuck on the coated surface and the state of coated surface was observed visually when peeled off this rapidly. The results are shown in Table 4.

TABLE 4

| | Test result | |
|---|---|---|
| | Compatibility | Adhesiveness |
| Example-1 | ○ | ○ |
| -2 | ○ | ○ |
| -3 | ○ | ○ |
| Comparative example-1 | Δ | ○ |
| -2 | ○ | X |

From Table 1, in Comparative example-1, wherein the modified polyolefin is maleic anhydride-modified product using no styrenic monomer, it is recognized that solution is turbid and tack also becomes strong, because of unreacted maleic anhydride remaining in the system, as known publicly. Conversely, in Comparative example-2, wherein, styrenic monomer was used approximately in equal quantity, the adherence and heat seal strength decrease, because of increased styrene content. Moreover, from Tables 2 and 3, it can be confirmed that the adherence, weather resistance and oil resistance decrease remarkably in Comparative example-2, wherein styrenic monomer content was high. Similarly, in Table 4, decreased adherence is seen in Comparative example-2.

As a result aforementioned, it is evident that, while the effect of combined use of styrenic monomer at the time of maleic anhydride modification is surely recognized as in publicly known reports, in the case of the quantity of styrenic monomer being high as reported conventionally, various physical properties such as adherence, weather resistance and oil resistance end up to decrease in the uses at which the invention aims, hence balanced excellent physical properties can be achieved only at the limited use level that was found according to the invention.

As described, it can be said that the inventive technique of the modified polyolefin is very useful.

What is claimed is:

1. A modified polyolefin composition having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) polypropylene, ethylene-propylene copolymer, wherein a propylene content of said ethylene-propylene copolymer is over 85% (by weight), or ethylene-propylene-butene copolymer, wherein a propylene content of said ethylene-propylene-butene copolymer is not less than 50% (by weight), the grafting weight ratio (B/C) of (B) to (C) being not less than 2 to not more than 5.

2. The modified polyolefin composition according to claim 1, wherein said modified polyolefin composition is chlorine free.

3. The modified polyolefin composition according to claim 1, having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) polypropylene, ethylene-propylene copolymer, wherein a propylene content of said ethylene-propylene copolymer is 95% (by weight), or ethylene-propylene-butene copolymer wherein a propylene content of said ethylene-propylene-butene copolymer is not less than 50%

(by weight), the grafting weight ratio (B/C) of (B) to (C) being not less than 2 to not more than 5.

4. The modified polyolefin composition according to claim 1, having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) ethylene-propylene-butene copolymer, wherein a propylene content of said ethylene-propylene-butene copolymer is not less than 50% (by weight), the grafting weight ratio (B/C) of (B) to (C) being not less than 2 to not more than 5.

5. A modified polyolefin composition obtained by graft polymerizing (B) maleic anhydride and (C) styrenic monomer onto polyolefin, wherein said polyolefin is (A) polypropylene, ethylene-propylene copolymer, wherein a propylene content of said ethylene-propylene copolymer is over 85% (by weight), or ethylene-propylene-butene copolymer, wherein a propylene content of said ethylene-propylene-butene copolymer is not less than 50% (by weight), the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

6. The modified polyolefin composition according to claim 5, wherein said modified polyolefin composition is chlorine free.

7. The modified polyolefin composition according to claim 5, obtained by graft polymerizing (B) maleic anhydride and (C) styrenic monomer onto polyolefin, wherein said polyolefin is (A) polypropylene, ethylene-propylene copolymer, wherein a propylene content of said ethylene-propylene copolymer is 95% (by weight), or ethylene-propylene-butene copolymer, wherein a propylene content of said ethylene-propylene-butene copolymer is not less than 50% (by weight), the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

8. The modified polyolefin composition according to claim 5, obtained by graft polymerizing (B) maleic anhydride and (C) styrenic monomer onto polyolefin, wherein said polyolefin is (A) ethylene-propylene-butene copolymer, wherein a propylene content of said ethylene-propylene-butene copolymer is not less than 50% (by weight), the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

9. An adhesive comprising the modified polyolefin composition of any one of claim 1 or 5.

10. A primer comprising the modified polyolefin composition of any one of claims 1 or 5.

11. A paint binder comprising the modified polyolefin composition of any one of claims 1 or 5.

12. An ink binder comprising the modified polyolefin composition of any one of claims 1 or 5.

13. A modified polyolefin composition having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) polypropylene, the grafting weight ratio (B/C) of (B) to (C) being not less than 2 to not more than 5.

14. A modified polyolefin composition having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) ethylene-propylene copolymer, wherein a propylene content of said ethylene-propylene copolymer is over 85% (by weight), the grafting weight ratio (B/C) of (B) to (C) being not less than 2 to not more than 5.

15. A modified polyolefin composition having a weight average molecular weight of not less than 30,000 to not more than 150,000, obtained by graft polymerizing 0.5 to 15.0% (by weight) of (B) maleic anhydride and 0.1 to 7.5% (by weight) of (C) styrenic monomer to (A) ethylene-propylene copolymer, wherein a propylene content of said ethylene-propylene copolymer is 95% (by weight), the grafting weight ratio (B/C) of (B) to (C) being not less than 2 to not more than 5.

16. A modified polyolefin composition obtained by graft polymerizing (B) maleic anhydride and (C) styrenic monomer onto polyolefin, wherein said polyolefin is (A) polypropylene, the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

17. A modified polyolefin composition obtained by graft polymerizing (B) maleic anhydride and (C) styrenic monomer onto polyolefin, wherein said polyolefin is (A) ethylene-propylene copolymer, wherein a polypropylene content of said ethylene-propylene copolymer is over 85% (by weight), the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

18. A modified polyolefin composition obtained by graft polymerizing (B) maleic anhydride and (C) styrenic monomer onto polyolefin, wherein said polyolefin is (A) ethylene-propylene copolymer, wherein a polypropylene content of said ethylene-propylene copolymer is 95% (by weight), the grafting rates of (B) to (A) being 0.5 to 15.0% (by weight) and of (C) to (A) being 0.1 to 7.5% (by weight), the weight ratio (B/C) of grafting rate of (B) to the grafting rate of (C) being not less than 2 to not more than 5, and the weight average molecular weight of the graft polymer grafted (B) and (C) onto (A) being not less than 30,000 to not more than 150,000.

* * * * *